INVENTOR.
John S. Tomer

Feb. 26, 1957  J. S. TOMER  2,782,436
PIPE CLEANER WITH TANDEM SCRAPING HEADS
Filed April 5, 1955  3 Sheets-Sheet 2

INVENTOR.
John S. Tomer
BY
Everett A. Johnson
ATTORNEY

Feb. 26, 1957  J. S. TOMER  2,782,436
PIPE CLEANER WITH TANDEM SCRAPING HEADS
Filed April 5, 1955  3 Sheets-Sheet 3

INVENTOR.
John S. Tomer
BY Everett A. Johnson
ATTORNEY

2,782,436

PIPE CLEANER WITH TANDEM SCRAPING HEADS

John S. Tomer, Tulsa, Okla.

Application April 5, 1955, Serial No. 499,351

9 Claims. (Cl. 15—104.04)

This invention relates to an apparatus for cleaning the exterior surface of pipe in place. More specifically, the invention relates to an adjustable apparatus for scraping the outer surface of an exposed section of pipe.

In the maintenance of buried pipe lines, it is frequencly necessary to uncover sections of the pipe where soil corrosion of the pipe has taken place. Typically, the pipe becomes pitted and corrosion products and the like may collect in the surface pits of the pipe. The exterior surface of the pipe must then be thoroughly cleaned to remove earth, rust, pipe coatings and other accumulations so that the pipe surface is exposed for inspection and for repair of the corrosion pits and other defects. These are repaired by arc welding which fills the pits flush with the pipe surface and prevents further deterioration at that point which may otherwise result in failure of the pipe.

Heretofore, it has been common practice to clean the surface of the pipe by hand tools by a chipping or scraping operation. This was a slow and costly operation and in cleaning the bottom surface of the pipe line the working conditions were bad and the hazards great. Various types of mechanical cleaners designed to operate on the entire surface of the pipe have been proposed but have been unsatisfactory in field use. Many of these devices have been complicated and have been ineffective in cleaning the pipe quickly and inexpensively.

Accordingly, it is a primary object of my invention to provide a new and improved portable apparatus for cleaning exposed sections of a pipe line in place. It is another object of my invention to provide a pipe cleaning apparatus which cleans the pipe in an inexpensive and simple manner. A further object of the invention is to provide a rugged and simple apparatus which may be drawn axially over exposed sections of pipe line to clean the entire surface of the pipe. Thus, in general, it is an object of the invention to provide an exterior scraper assembly which is adapted to contact with the pipe surface and enter the pitted areas therein to remove foreign matter therefrom. These and other objects of the invention will become apparent as the description thereof preceeds.

Briefly, the apparatus comprises a pair of cleaning heads connected in tandem by self-adjusting coupling means whereby the front and rear heads are individually free to follow the contour of the pipe when bends are encountered. Each head is provided with a plurality of concave rollers for peripherally aligning the head frames with the axis of the pipe. A plurality of spaced cutter knives are pivotally held on the forward ends of cantilever spring supports which are anchored to the head frames. The cutter knives carried by each of the heads are arranged in non-tracking or peripherally off-set arrangement so as to have complete coverage of the pipe surface. A secondary spring arm releasably retains the cutter knives at right angles to the axis of the pipe, but the knives are permitted to revolve radially on a hinge means at the end of the cantilever spring support when an obstruction is encountered on the surface of the pipe.

My invention will be further described with reference to a preferred embodiment thereof which is illustrated in the accompanying drawings wherein.

Figure 1:
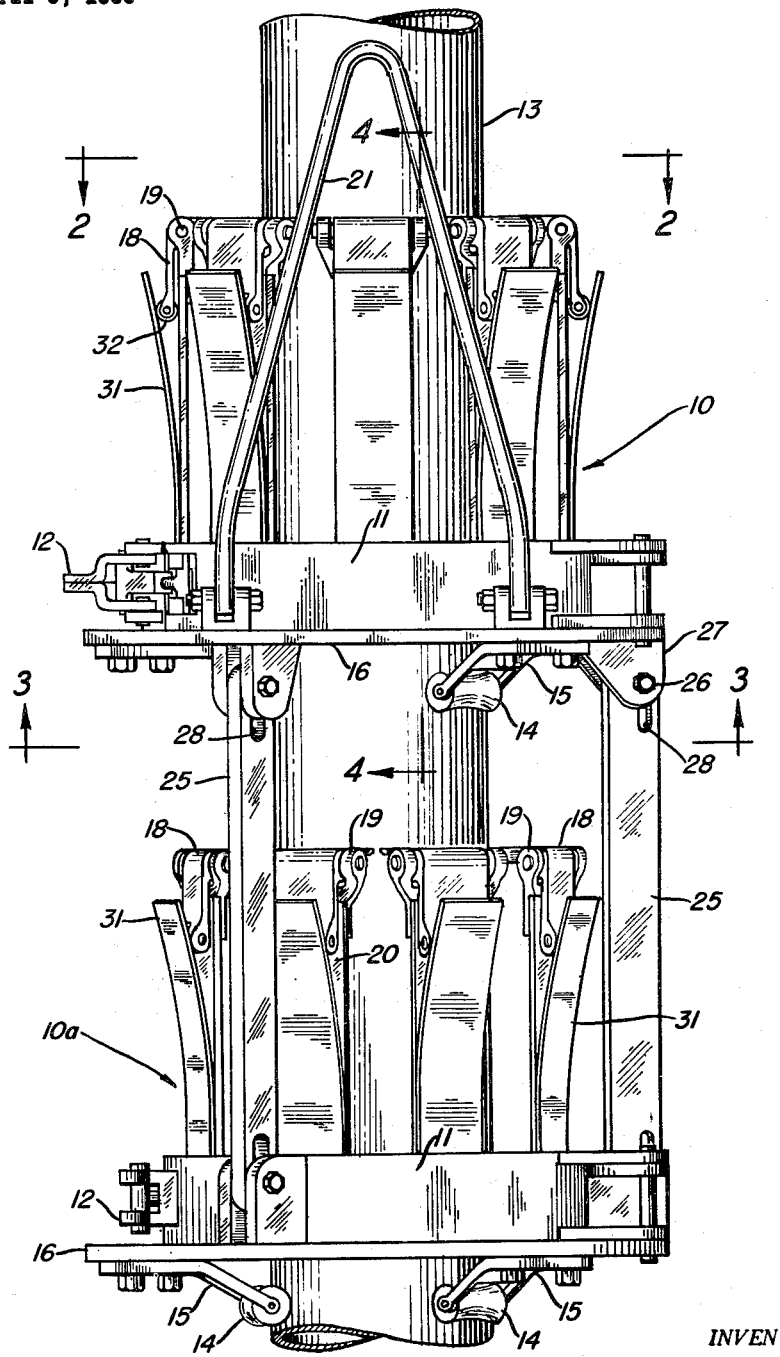
Figure 1 is a plan view of the apparatus arranged about a section of pipe to be cleaned.
Figure 2:
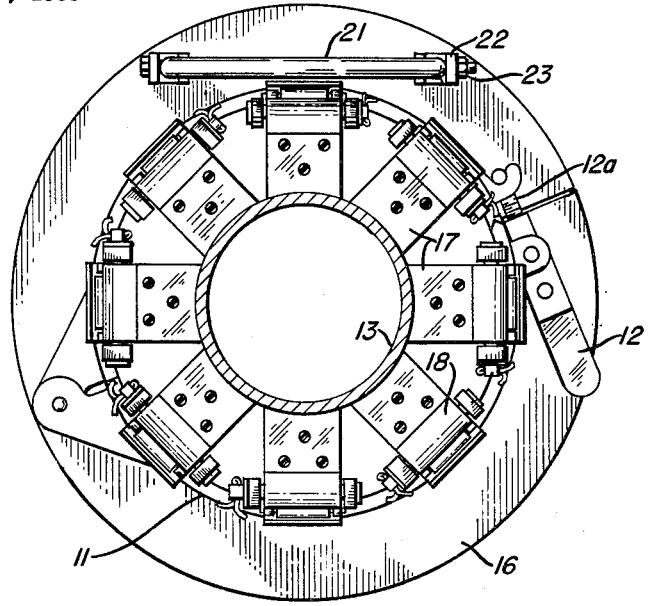
Figure 2 is an end view of the apparatus taken along the line 2—2 in Figure 1 and showing the radial cutters in the front cleaning head.
Figure 3:
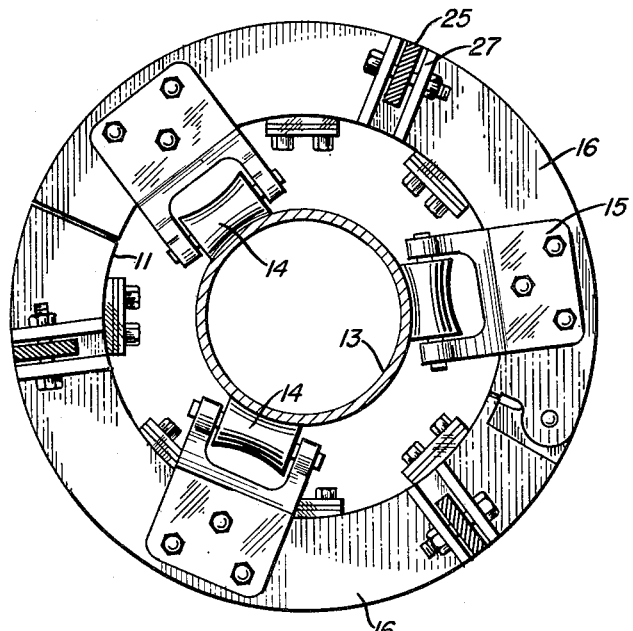
Figure 3 is a sectional view of the front cleaning head taken along the line 3—3 in Figure 1.

Referring to Figure 1, the complete cleaning machine includes a pair of cleaning heads 10 and 10a which are of generally similar construction. Each head 10 and 10a includes a frame which comprises a split ring 11 having a radial flange 16, best shown in Figures 2 and 3. A toggle lever means 12 serves as an adjustable latch to secure the split ring 11 after the machine is in place about the pipe line section. Some variation in the size of the split ring 11 can be made by adjusting the threaded rod 12a in toggle lever 12. In most instances, however, it is preferred to provide a cleaning assembly which is designed for a particular size of pipe.

A plurality of concave rollers 14 are rotatably and flexibly supported by each head and, in a preferred embodiment, the rollers 14 are supported by leaf springs 15 which extend rearwardly and inwardly of the ring 11. These rollers 14 serve to maintain the two cleaning heads 10 and 10a in alignment with the axis of the pipe 13. Such a resilient mounting arrangement of the aligning rollers 14 allows the cleaner to pass over welds, collars or other irregularities on the outside of the pipe 13 which are ordinarily smaller in outer diameter than the clearance provided by heads 10 and 10a.

The cutter knives 17 are mounted on pivoted holders 18 which are rotatably held in hinge means such as yokes 19 on the deflectable ends of spring beams or arms 20 thereby accommodating obstructions which may be encountered in passing along the pipe 13.

Figure 4:
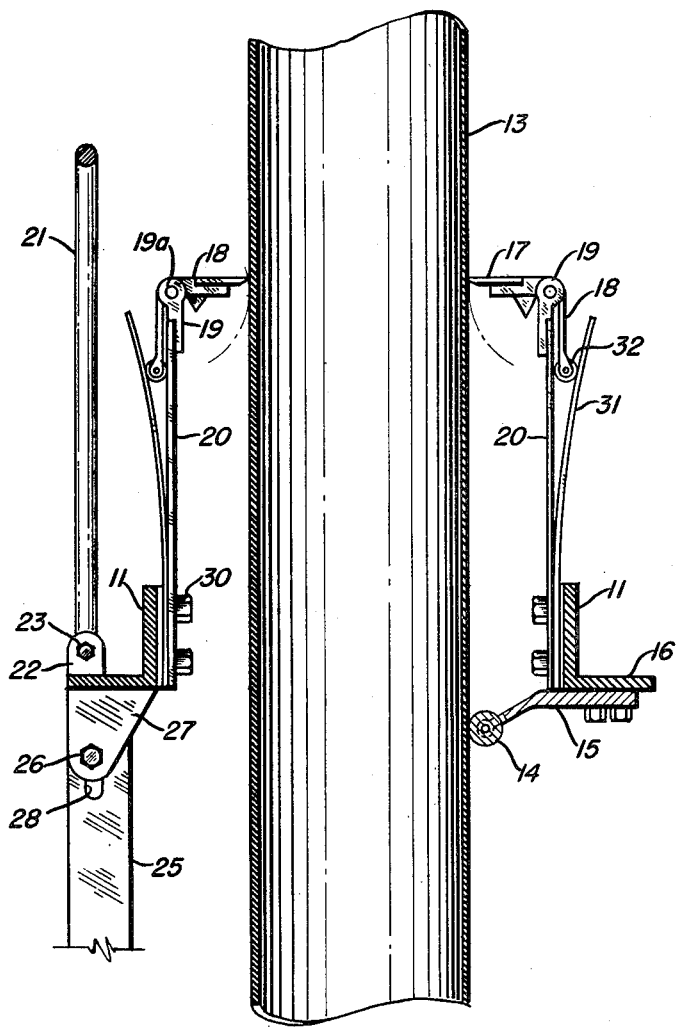
Figure 4 is a fragmentary enlarged sectional view of the cutter means viewed along the line 4—4 in Figure 1.

Referring to Figure 4, each cutter knife 17 is removably fixed to a substantially right angular holder 18 which is pivotally supported on pins 19a in yoke 19 at the free end of cantilever spring arm support 20, the fixed end of which is secured to the lower face of the ring 11 by means of stud bolts 30. One arm of the holder 18 extends rearwardly above the spring arms 20 and the second arm of the holder 18 extends substantially normal to the plane of the spring arms 20. Overlying the spring arm 20 and also fixed to the flat ring 11 is a secondary spring arm 31 which contacts the roller 32 on the rearward end of the lateral arm of the holder 18.

The heads 10 and 10a are connected by coupling means shown in the drawing as comprising three bars 25 spaced 120 degrees apart and having closed slots 28 by which the bars are pivotally connected by pins 26 and blocks 27 to the radial flange 16. The slots 28 in both ends of the bars 25 permit the cleaning heads 10 and 10a to individually follow the pipe and maintain the peripheral alignment of the two heads 10 and 10a so that the paths of the cutter knives 17 in the two heads overlap. This type of open construction between the tandem cleaning heads 10 and 10a permits the cuttings removed from the pipe 13 by the rear cleaning head 10a to fall from the pipe 13 without interference from the coupling means. In some instances, it may be possible to substitute flexible coupling members, such as lengths of cable or chain, for one or more of the bars 25.

The front or leading head 10 is provided with a shackle 21 pivotally fixed by means of blocks 22 and pins 23 to the radially extending flange 16 on the ring 11.

A cable (not shown) is fixed to the shackle 21 for moving the machine longitudinally over the pipe line 13.

In travelling over the pipe 13, the primary spring arms 20 and 31 hold the cutter knives 17 against the surface of the pipe 13 regardless of wear on the individual knives. The cutter holders 18 revolve in the yokes 19 of the spring arms 20 when an obstruction is encountered on the surface of the pipe 13. The cutter holders 18 are in turn retained at substantially right angles to the axis of the pipe 13 by means of the secondary spring arms 31 acting against the transverse roller 32 on the arm of the cutter holder 18. Thus, the more rigid spring arm 20 serves as a support for the cutter holder 18 and maintains sufficient pressure on the cutter knife 17 to clean the pipe regardless of wear on the cutting surface; and the secondary spring arms 31 (which may be more resilient than beam 20) aids in maintaining this radially inward pressure but also overlies roller 32 of holder 18 and serves the important function of flexibly keeping the cutter knife 17 at substantially right angles to the pipe being cleaned.

Although I have described my invention with reference to a particular embodiment thereof shown in the drawings, it should be understood that this is by way of example only and that my invention is not necessarily limited thereto. Alternative embodiments of the apparatus will become apparent to those skilled in the art in view of my disclosure and, accordingly, it is contemplated that modifications may be made in the apparatus without departing from the spirit of my invention.

What I claim is:

1. An apparatus for cleaning pipe comprising in combination a pair of substantially similar cleaning heads, coupling means for flexibly connecting said cleaning heads in tandem, shackle means fixed to the leading head for drawing said heads over said pipe, each of said heads comprising a hinged split ring, a plurality of spring arms having one end fixed to said ring and a free end extending forwardly thereof, pivotally supported cutters at said free ends of said spring arms adapted to be resiliently held in cutting position against said pipe by said spring arms, and resilient means normally maintaining said cutters in a cutting position to scrape said pipe and, when an obstruction on the surface of said pipe is encountered, permitting said cutters to revolve on said spring arms out of said cutting position.

2. The apparatus of claim 1 wherein said cutters in one of said cleaning heads are peripherally off-set with respect to said cutters in the other cleaning head so that the paths of said cutters in the two heads peripherally overlap and scrape the entire outer surface of said pipe when the apparatus is drawn axially thereof.

3. The apparatus of claim 1 wherein the coupling means for connecting the cleaning heads comprise a plurality of bars each having closed slots at their ends and hingedly fixed to both of said heads.

4. An apparatus for cleaning the exterior of pipe which comprises in combination a pair of substantially identical cleaning heads, coupling means for flexibly connecting said cleaning heads in tandem, shackle means fixed to the leading head for drawing said heads in tandem over said pipe, each of said heads comprising a split ring having a radially extending flange, a plurality of aligning rollers mounted inwardly and rearwardly of said ring, said rollers being adapted to align said heads with respect to the axis of said pipe, toggle lever means for securing said split ring in closed position about said pipe, a plurality of spring arms fixed at one end to said ring and extending forwardly thereof, hinge means at the free end of each of said spring arms, cutter holders pivotally supported in said hinge means, said holders including two angularly disposed arms, a cutter knife fixed to one of said arms, the second of said arms overlying an end of said spring arm, a secondary spring arm extending forwardly from said ring to a point over said second holder arm whereby said primary spring arm maintains pressure on said cutter knife and said secondary spring arm acts on said second arm to maintain said knife in a cutting position.

5. The apparatus of claim 4 wherein the said aligning rollers are supported on leaf springs extending inwardly and rearwardly of the cleaning head.

6. The apparatus of claim 4 wherein the said second of said holder arms is provided with an anti-friction roller means for contacting the secondary spring arm.

7. An apparatus for cleaning the exterior of pipe sections by the action of cutter knives comprising in combination a pair of substantially identical pipe-encircling cleaning heads, hinged coupling means flexibily connecting said cleaning heads in tandem, means carried by the leading head for drawing said heads in tandem along and about an exposed pipe section, each of said heads comprising a split ring adapted to be arranged concentric to the pipe section and having a radially extending flange, a plurality of inwardly extending aligning roller means supported by said flange, said rollers being adapted to contact the pipe to be cleaned and to align said heads with respect to the exterior of said pipe, adjustable toggle lever means for securing said split ring in closed position about such pipe, a plurality of spring beams fixed to and extending forwardly of said ring, cutter holders pivotally supported at the forward end of each of said spring beams, said holders comprising substantially right angular arms, the first of said arms overlying said primary spring beam and the second of said arms extending radially inward from the end of said spring beam, a cutter knife fixed to said second arm, and a secondary spring arm extending forwardly from said ring to engage said first holder arm whereby said primary spring beam maintains pressure on said cutter knife and said secondary spring arm acts on said first holder arm to urge said cutter knife into a cutting position.

8. The apparatus of claim 7 which includes a leaf spring support for said aligning rollers, said secondary spring arm being substantially more resilient than said primary spring beam support, and said first holder arm is provided with a transverse roller bearing at its free end for rolling contact with said secondary spring arm.

9. The apparatus of claim 7 wherein said coupling bar means comprise essentially three bars substantially longer than said primary spring beams, a closed slot at each end of each of said bars, and transverse pin means fixed to said flange, said pin means being slidable within said closed slots whereby the cutting heads are maintained in axially spaced relationship while permitting the heads to turn independently of each other when a non-linear portion of the pipe section is encountered.

References Cited in the file of this patent

UNITED STATES PATENTS

| | | |
|---|---|---|
| 1,680,372 | Fenn | Aug. 14, 1928 |
| 1,887,853 | Jinnett | Nov. 15, 1932 |